United States Patent [19]
Klimczak et al.

[11] Patent Number: 5,395,409
[45] Date of Patent: Mar. 7, 1995

[54] DUST COLLECTING APPARATUS HAVING REVERSE PULSE FILTER CLEANING CAPABILITY

[75] Inventors: William J. Klimczak, Charlotte, N.C.; Robert R. Edwards, Fort Mill, S.C.

[73] Assignee: Dustex Corporation, Charlotte, N.C.

[21] Appl. No.: 192,122

[22] Filed: Feb. 3, 1994

[51] Int. Cl.⁶ .............................................. B01D 46/00
[52] U.S. Cl. ................................... 55/302; 55/341.1; 95/280
[58] Field of Search .............. 55/284, 293, 302, 341.1, 55/341.6, 379; 95/280

[56] References Cited

U.S. PATENT DOCUMENTS

| | | | |
|---|---|---|---|
| 1,995,650 | 3/1935 | Rathbun | 55/302 |
| 3,509,698 | 5/1970 | Medcalf et al. | 55/302 |
| 3,726,066 | 4/1973 | Colley et al. | 55/341.1 |
| 3,837,150 | 9/1974 | Kubiak | 55/302 |
| 4,082,523 | 4/1978 | Pausch | 55/302 |
| 4,264,345 | 4/1981 | Miller | 55/302 |
| 4,367,080 | 1/1983 | Kordas | 55/302 |
| 4,544,389 | 10/1985 | Howeth | 55/302 |
| 4,578,092 | 3/1986 | Klimczak | 55/302 |
| 4,661,131 | 4/1987 | Howeth | 55/302 |
| 4,666,472 | 5/1987 | Klimczak et al. | 55/302 |
| 4,690,700 | 9/1987 | Howeth | 55/302 |
| 4,692,176 | 9/1987 | Israelson | 55/302 |
| 5,062,867 | 11/1991 | Klimczak | 55/302 |
| 5,156,660 | 10/1992 | Wilson | 55/302 |
| 5,180,110 | 1/1993 | Brame | 55/302 |

Primary Examiner—Charles S. Bushey
Attorney, Agent, or Firm—Bell, Seltzer, Park & Gibson

[57] ABSTRACT

A dust collecting apparatus wherein a plurality of elongate filter elements are periodically cleaned by a reverse pulse cleaning system which directs a reverse pulse of air through the open end of each filter element so as to remove contaminants which have collected on its external surface. The reverse pulse cleaning system has an air delivery pipe above each of the filter elements, and each air delivery pipe includes an air delivery nozzle assembly which includes at least one pair of transverse pipe sections which are transversely aligned and extend in opposite directions from the air delivery pipe, to define a cross-like configuration in plan view. A plurality of apertures are disposed in a linear line along the air delivery pipe, and at least one aperture is disposed in each of the transverse pipe sections. By this arrangement, the cross-sectional configuration of the reverse pulse of air entering into the top of each filter element may be predetermined, so as to ensure that the pulse properly impacts the interior of the filter element and effectively removes the collected contaminants.

8 Claims, 3 Drawing Sheets

DUST COLLECTING APPARATUS HAVING REVERSE PULSE FILTER CLEANING CAPABILITY

BACKGROUND OF THE INVENTION

The present invention relates to a dust collecting apparatus having a plurality of filter elements for filtering an airstream and wherein a jet of pressurized air is periodically injected in the reverse direction into the open end of each filter element to expel the accumulated particles from the outside surface of the element.

Conventional self-cleaning dust collectors of the described type typically comprise a sheet metal housing which is divided by a transverse panel having a plurality of rows of openings therein, and so that the panel defines a lower air inlet chamber and an upper air outlet chamber. Cylindrical filter elements, such as fabric filter bags or cartridge filters, are mounted so as to be in registry with the openings and they depend downwardly into the inlet chamber. In operation, the dust laden air enters the inlet chamber and the entrained particles are deposited on the outside surfaces of the filter bags, and the filtered air flows upwardly through the inside of the bags and is discharged through the upper outlet chamber.

The filter bags are periodically cleaned by means of a pulse jet, wherein a momentary (e.g. 0.1 second) jet of high velocity compressed air is directed downwardly into each bag. More particularly, the rows of bags are pulsed in sequence, and a continuous flow of air is maintained in the filtering direction since only a small number of the bags are pulsed at any given time. Also, it is conventional to mount a Venturi nozzle in the open end of each bag so that the pulsed jet of air induces additional or secondary air into the bag with the jet of air. The resulting volume of air produces a pressure pulse which travels down the length of the bag and serves to dislodge and expel the accumulated particles on the outside surface. The dislodged particles then fall downwardly into a hopper at the bottom of the housing, where they may be removed. A dust collector of this general type is disclosed in U.S. Pat. No. 3,726,066 to Colley et al and U.S. Pat. No. 5,062,867 to Klimczak.

It is recognized that the reverse pulse of air should enter the opening in the top of each filter element in a predetermined cross-sectional configuration, so as to ensure that the pulses properly impact the interior of the filter element and remove the collected contaminants from the entire flow area of the filter medium. To achieve the proper cross-sectional configuration, it is conventional to mount an insert of predetermined outline in the top of the filter element, so as to shape the entering air pulse to the desired configuration. While such inserts are satisfactory in operation, they significantly increase the cost of the apparatus.

It has also been proposed to provide a reverse pulse system which includes an annular ring above each filter, with the annular ring having very small apertures around its circumference for discharging the air into the filter in the form of a tube. The use of an annular ring of this type is also quite expensive, and it does not provide flexibility in being able to shape the cross-sectional configuration of the reverse pulse to conform to the size and shape of the filter and achieve complete cleaning thereof.

It is accordingly an object of the present invention to provide a dust collecting apparatus of the described type and which overcomes the above noted limitations and disadvantages of the prior art.

It is a more particular object of the present invention to provide a dust collecting apparatus which is adapted to provide a reverse pulse of air for each filter element, with the pulse of air having a predetermined cross-sectional configuration designed to properly impact the full area of the filtering medium so as to remove all of the collected contaminants from the exterior of the filter element, and which does not employ the use of separate inserts for this purpose.

SUMMARY OF THE INVENTION

The above and other objects and advantages of the present invention are achieved in the embodiments illustrated herein by the provision of a dust collecting apparatus which comprises a housing having a transverse panel dividing the housing into an inlet chamber and an outlet chamber. A plurality of openings are positioned in the panel, with the openings being arranged in parallel rows of spaced apart openings, and a plurality of elongate filter elements are provided, each having an open end and a closed end, with the filter elements being mounted to the panel such that the open ends are in registry with respective ones of the openings in the panel. Also, the filter elements depend from the openings into the inlet chamber, and such that an airstream passing through the filter elements from the inlet chamber to the outlet chamber deposits any entrained particulate matter on the exterior surface of the filter elements. Reverse pulse cleaning means is provided for periodically directing reverse pulses of pressurized air into the open ends of the filter elements so as to expel accumulated particulate matter from the exterior surface of the active bag elements.

In the preferred embodiment, the reverse pulse cleaning means comprises a plurality of air delivery nozzle assemblies positioned in the outlet chamber and in alignment above respective ones of the panel openings. Each nozzle assembly includes a central pipe extending in a longitudinal direction and at least one transverse pipe section communicating with the central pipe and extending in a direction transverse thereto. A plurality of apertures are disposed in each of the nozzle systems for directing a pulse of air of predetermined cross-sectional configuration into each of the panel openings. Each air delivery nozzle assembly preferably comprises at least one pair of transverse pipe sections which are transversely aligned and extend in opposite directions from the central pipe to define a cross-like configuration in plan view. Also, the apertures are preferably disposed in a linear line in the central pipe, and at least one of the apertures is disposed in each of the transverse pipe sections. With this configuration and arrangement of the apertures, the cross-sectional configuration of the reverse air pulses may be selected to properly impact the full area of the filtering median and thereby cause removal of all of the collected contaminants from the exterior of the filter. Also, the use of a pulse shaping insert adjacent the open end of the associated filter element for the purpose of shaping the reverse pulse is unnecessary.

BRIEF DESCRIPTION OF THE DRAWINGS

Some of the objects and advantages of the present invention having been stated, others will become appar

DETAILED DESCRIPTION OF THE PREFERRED EMBODIMENTS

Figure 1:
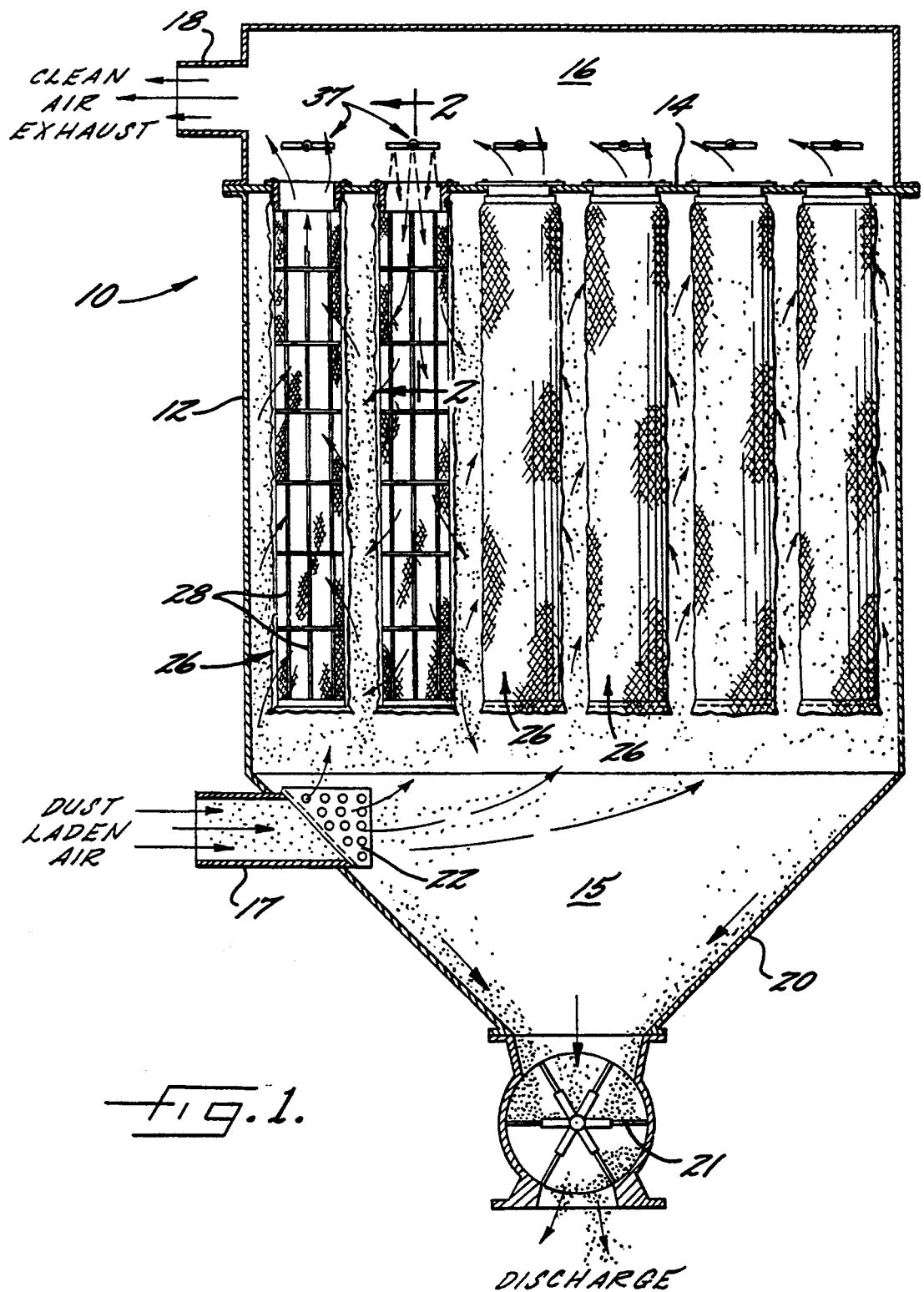
- FIG. 1 is a sectioned side elevation view illustrating a dust collecting apparatus which embodies the features of the present invention.
Figure 2:
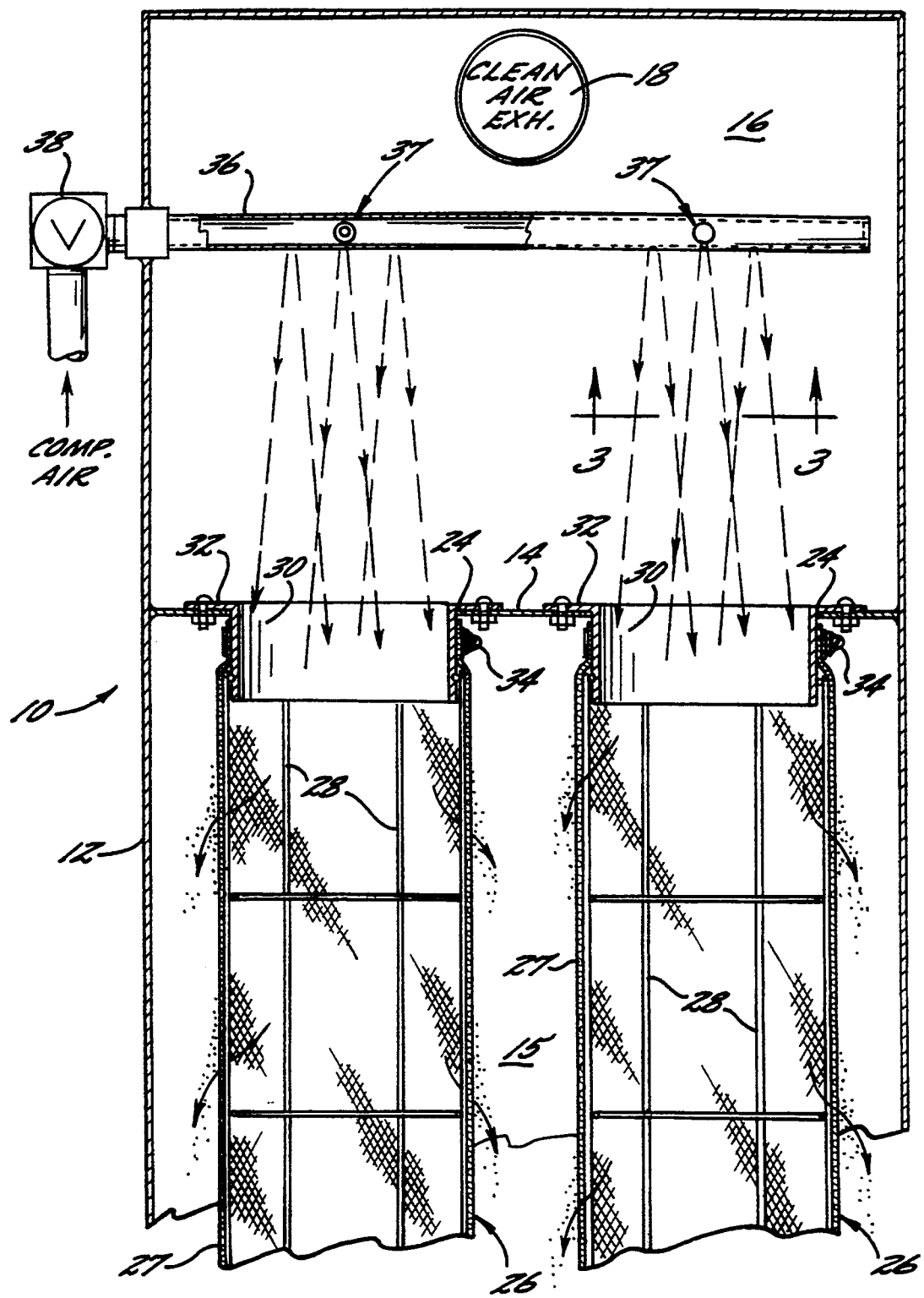
FIG. 2 is a fragmentary sectional end elevation view of the upper portion of the apparatus shown in FIG. 1, and taken substantially along the line 2—2 of FIG. 1.
Figure 3:
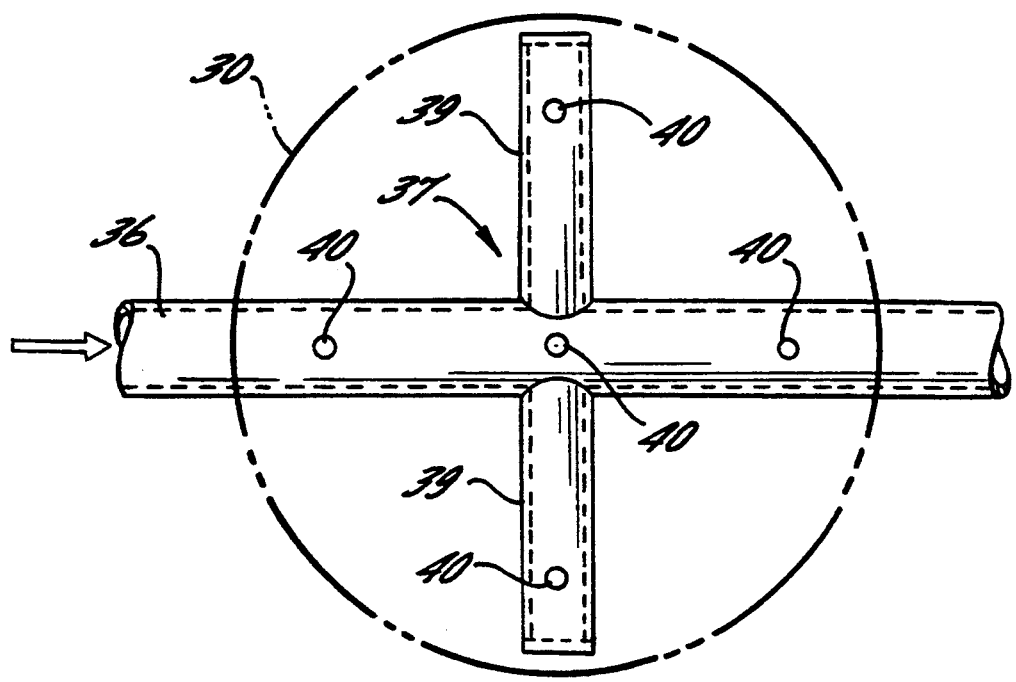
FIG. 3 is a fragmentary bottom plan view of one of the air delivery nozzle assemblies of the present invention and taken substantially along line 3—3 of FIG. 2.

Referring more particularly to the drawings, FIGS. 1-3 illustrate a dust collecting apparatus 10 which embodies the present invention. The apparatus 10 includes an enclosed housing 12 which is subdivided by a horizontal panel 14 which extends transversely across the housing. The panel thus divides the housing into a lower air inlet chamber 15 and an upper outlet chamber 16. Also, an inlet opening 17 communicates with the inlet chamber 15 for admitting the dust laden air, and an outlet opening 18 communicates with the outlet chamber 16 for exhausting the clean air. Further, the bottom portion of the housing defines a hopper 20, with a material discharge air lock 21 at the bottom thereof. Also, an air diffuser 22 is mounted at the outlet of the inlet opening 17 for the purposes described below.

The transverse panel 14 includes a plurality of circular openings 24 which are arranged in six longitudinal rows, each row having two spaced apart openings 24 in the illustrated embodiment. A plurality of elongate filter bag elements 26 are mounted to the panel 14 and so as to depend into the inlet chamber 15 from each opening 24. Each of the filter bag elements comprises an elongate cylindrical bag 27 of porous fabric material, and which has an open upper end and a closed lower end. Each bag 27 is supported in an open cylindrical configuration by a rigid internal wire framework or cage 28 of conventional design.

Each bag 27 is mounted to the panel so that its open end is in registry with an associated opening 24 of the panel. The mounting structure for each bag includes a cylindrical sleeve 30, which includes an upper flange 32 which is secured to the panel by bolts (note FIG. 2), and so that the cylindrical sleeve 30 is affixed coaxially to the periphery of the opening 24 in the panel 14. The wire cage 28 is attached to the lower portion of the sleeve 30, and the upper open end of the bag 27 extends above the cage and is clamped about the outer periphery of the sleeve 30 by a suitable circumferential band 34.

The apparatus 10 also includes reverse pulse cleaning means for periodically directing reverse pulses of pressurized air into the open ends of the filter bag elements 26, so as to expel accumulated particulate matter from the exterior surface of the bags 27. The reverse pulse cleaning means comprises an air delivery pipe 36 extending within the outlet chamber 16 in spaced relation above and aligned with each of the longitudinal rows of openings 24. Each of the pipes 36 includes an air delivery nozzle assembly 37 which is directed toward each of the bag elements of the associated row. Each of the pipes 36 is operatively connected to a source of pressurized air via a separate valve 38, and a control arrangement of conventional design is provided (not shown) for sequentially opening the valves 38 for a short period of time.

In the embodiment of FIGS. 1-3, each air delivery nozzle assembly 37 comprises a portion of the length of the air delivery pipe 36 which is positioned in the outlet chamber in alignment above each of the rows of openings, and a pair of transverse pipe sections 39 which are transversely aligned and extend in opposite directions from the air delivery pipe 36 to define a cross-like configuration in plan view as seen in FIG. 3. The transverse pipe sections 39 communicate with the interior of the air delivery pipe 36. Also, in the embodiment of FIG. 3, three apertures 40 are disposed in a linear line in the air delivery pipe, and one aperture 40 is disposed in each of the transverse pipe sections 39.

In operation, the dust laden air enters the inlet chamber 15 via the inlet opening 17, and the diffuser 22 engages the heavier particles and causes them to be separated from the airstream and fall into the hopper 20. The remaining dust particles accumulate on the outside surface of the filter bags 27, and periodically a momentary jet of high pressure air is pulsed through the upper open ends of each row of bags. The high pressure jet induces a secondary flow of air from the outlet chamber 16 into each bag, thereby producing a reverse flow of air which expels the accumulated particles from the outside surface and thereby cleans the bags. During the pulse cleaning of each row, continuous flow is maintained through the other bags of the other rows. This is illustrated in FIG. 1, which shows the second row of bag elements from the left side being pulsed, with the bags of the remaining rows being operative.

It has been found that the multiple air jets emanating from the several apertures of the air delivery nozzle assemblies 37 during the reverse pulse cleaning cycle interact with each other to form a cylindrical composite stream in a very short distance. Thus the pipe 36 and the assemblies 37 may be located a relatively short distance above the open ends of the bags. Also, the specific configuration of the cylindrical stream may be readily controlled by the positioning of the apertures 40 in the pipes. In prior apparatus of this type, inserts in the form of cylinders, cones or other shapes of tubes have been required at the open ends of the bags to form the stream into the desired configuration. The present invention has been found to render such additional components unnecessary.

Figure 4:
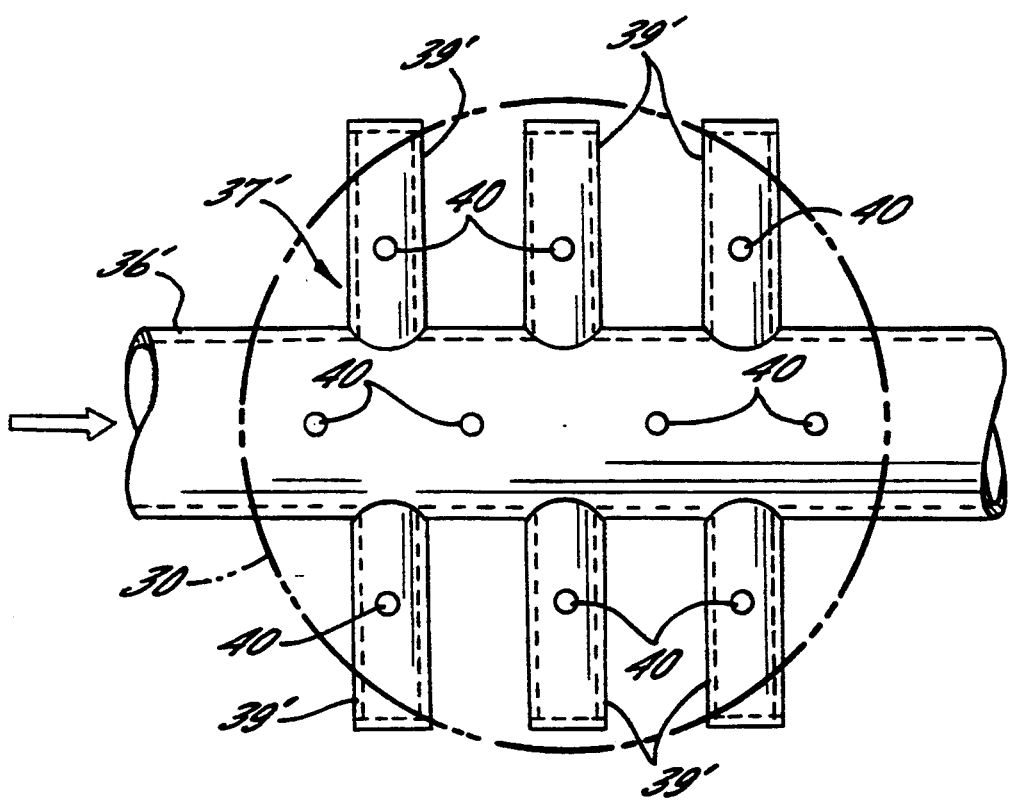
FIG. 4 is a view similar to FIG. 3 but illustrating another embodiment of the air delivery nozzle assembly.

FIG. 4 illustrates a second embodiment wherein the air delivery nozzle assemblies 37' each include three pairs of transverse pipe sections 39' which are transversely aligned and extend in opposite directions from the air delivery pipe 36'. Here again, a plurality of the apertures 40 are disposed in a linear line along the air delivery pipe, and one aperture is disposed in each of the transverse pipe sections 39'. This configuration is suitable in applications where a relatively large volume of air is required for the adequate cleaning of the filters.

In the drawings and specification, there has been set forth a preferred embodiment of the invention, and although specific terms are employed, they are used in a generic and descriptive sense only and not for purposes of limitation.

That which is claimed is:

1. A dust collecting apparatus comprising a housing having a transverse panel dividing said housing into an inlet chamber and an outlet chamber, with said panel having a plurality of openings therein, a plurality of elongate filter elements each having an open end and a closed end, with said filter elements being mounted to said panel such that said open ends are in registry with respective ones of said openings in said panel and the filter elements extend into said inlet chamber, reverse pulse cleaning means for periodically directing a reverse pulse of air through each of said panel openings and into the open ends of each of said filter elements, with said reverse pulse cleaning means comprising a plurality of air delivery nozzle assemblies positioned in said outlet chamber and in alignment with respective ones of said openings, and with each of said nozzle assemblies including a central pipe extending in a longitudinal direction and at least one transverse pipe section communicating with said central pipe and extending in a direction transverse thereto, and a plurality of apertures disposed in each of said nozzle assemblies for directing a pulse of air of predetermined cross-sectional configuration into each of said panel openings, and valve means for periodically introducing high pressure air into said central pipe.

2. The dust collecting apparatus as defined in claim 1 wherein said openings in said panel are each characterized by the absence of a pulse shaping insert positioned adjacent the open end of the associated filter element.

3. The dust collecting apparatus as defined in claim 2 wherein each of said air delivery nozzle assemblies further includes at least one pair of said transverse pipe sections which are transversely aligned and extend in opposite directions from said central pipe to define a cross configuration in plan view.

4. The dust collecting apparatus as defined in claim 3 wherein a plurality of said apertures are disposed in a linear line in said central pipe, and at least one of said apertures is disposed in each of said transverse pipe sections.

5. A dust collecting apparatus comprising a housing having a transverse panel dividing said housing into a lower inlet chamber and an upper outlet chamber, with said panel having a plurality of openings arranged in parallel rows of openings, a plurality of elongate filter elements each having an open end and a closed end, with said filter elements being mounted to said panel such that said open ends are in registry with respective ones of said openings in said panel and the filter elements depend into said lower inlet chamber, reverse pulse cleaning means for periodically directing a reverse pulse of air through each of said openings and into the open ends of each of said filter elements, with said reverse pulse cleaning means comprising an air delivery pipe positioned in said outlet chamber in alignment above each of said rows of openings, with each of said air delivery pipes including a plurality of air delivery nozzle assemblies positioned in alignment above respective ones of said panel openings, and with each of said nozzle assemblies including at least one transverse pipe section communicating with said air delivery pipe and extending in a direction transverse thereto, and a plurality of apertures disposed in each of said nozzle assemblies for directing a pulse of air of predetermined cross-sectional configuration into each of said panel openings, and valve means for periodically introducing high pressure air into each of said air delivery pipes.

6. The dust collecting apparatus as defined in claim 5 wherein each of said air delivery nozzle assemblies includes at least one pair of said transverse pipe sections which are transversely aligned and extend in opposite directions from the associated air delivery pipe to define a cross configuration in plan view, and wherein a plurality of said apertures are disposed in a linear line in the air delivery pipe, and at least one of said apertures is disposed in each of said transverse pipe sections.

7. The dust collecting apparatus as defined in claim 5 wherein each of said air delivery nozzle assemblies includes a plurality of pairs of said transverse pipe sections which are transversely aligned and extend in opposite directions from the associated air delivery pipe to define a cross configuration in plan view, and wherein a plurality of said apertures are disposed in a linear line in the air delivery pipe, and at least one of said apertures is disposed in each of said transverse pipe sections.

8. The dust collecting apparatus as defined in claim 6 wherein said openings in said panel are each characterized by the absence of a pulse shaping insert positioned adjacent the open end of the associated filter element.

* * * * *